March 1, 1938. R. S. BASSETT 2,109,916
WATER METER PISTON
Filed Oct. 7, 1937

INVENTOR
Robert S. Bassett

Patented Mar. 1, 1938

2,109,916

UNITED STATES PATENT OFFICE 2,109,916

WATER METER PISTON

Robert S. Bassett, Buffalo, N. Y.

Application October 7, 1937, Serial No. 167,744

4 Claims. (Cl. 121—69.5)

This invention relates to water meters and more particularly to a construction for pistons used in hot water meters, with special reference to cutting down the weight of a piston having a metal rim around its outer circumference.

In water meters of the positive displacement type in which the piston nutates about two conical surfaces placed in a hollow sphere, the piston or moving member is commonly made of hard rubber which is peculiarly adapted for this use because it is of practically the same specific gravity as the water which it displaces. This usual construction with hard rubber, however, is not satisfactory where water temperatures exceed 100° Fahrenheit, as commercial hard rubber is expanded and softened by water at the higher temperatures and is forced against the walls of the chamber, becoming deformed and rendered inoperative.

In order to measure low flows of little energy successfully, it is necessary that the amount of clearance between the piston or moving member and the walls of the measuring chamber must be very small, to prevent water from leaking past excessively. While a commercial hard rubber piston could be made considerably undersize so that this expansion would not force it against the walls of the chamber, such a method of constructing a hot water meter piston is not practicable, as these meters must not only measure hot water accurately but also must be accurate when measuring cold water with the piston and measuring chamber unexpanded by the heat.

In the common house size of water meter, the diameter of the meter piston is about 3″ and the allowable clearance is usually two one-thousandths of an inch. A bronze measuring chamber will expand about two one-thousandths of an inch during a rise of temperature from 90° to 212° Fahrenheit. It is, therefore, self-evident that a 3″ piston must not expand more than six one-thousandths of an inch during the same rise in temperature.

Tests have been made with many molded plastic materials to determine whether or not a plain unreinforced piston can be used on hot water meters. Practically the only molded plastic material, which will not expand and swell excessively when immersed continuously in hot water, is ordinary molded carbon such as is used for electric motor brushes and which may or may not contain a certain amount of graphite. This material, however, is so brittle that it cannot be used successfully for hot water meter pistons operating at normal speeds. Modifications of this material have been used with small quantities of hard rubber acting as a binder for the carbon and graphite and other mineral filler, but such compositions expand too much when heated and at the same time soften to a very considerable extent. They have the advantage, however, that they are not disintegrated by the hot water, a very serious objection to other molded plastics such as those of the bakelite class.

A solution of the hot water meter disc problem would, therefore, appear to be in the use of molded carbon or molded modified carbon together with a strong, rigid metallic frame which would expand practically the same as the metallic measuring chamber and would give the disc necessary strength and shock resistance at all temperatures and which would also prevent the expansion of the piston more than two or three one-thousandths of an inch, when increased in temperature from 90° to 212° Fahrenheit.

It is not possible to mold carbon around an internal metallic reinforcing plate as the molded carbon does not adhere naturally to the plate and the thin layers of carbon on either side of a central reinforcing plate would be so fragile that they would flake off. In my invention, however, I have provided a metallic reinforcement for the piston which will allow the use of molded carbon. The shape of the reinforcement is such that the carbon is molded in a single piece of considerable thickness and fits into the reinforcement in such a way that it cannot fall out even if cracked in a few places.

My reinforcement similarly allows the use of a composition containing carbon and mineral filler together with a hard rubber binder, as a slight softening or swelling of the material will not cause seizure of the piston. My reinforcement provides all necessary strength for the piston and the molded plastic material itself is not subjected to any appreciable stress so that its weakening when heated no longer is a material factor. I have stated that the clearance of a 3″ meter piston is usually two one-thousandths of an inch by which I mean that the clearance on the flat sides is two one-thousandths of an inch as well as on the outer edge. There are a number of compositions which will expand about 1% of their volume when heated as previously described. If such molded pieces are unconfined the expansion usually occurs mostly on the diameter which would expand ½% on any diameter to give an expansion in volume of 1%. An expansion of ½% on a 3″ diameter is fifteen one-thousandths of an inch, which, of course, cannot be allowed, all as previously explained.

If, however, the diameter of the molded composition part is confined by a metal ring, like steam is confined in a steam engine cylinder, the expansion will take place on the thickness of the piece which would then expand 1%. On a thickness of $\frac{3}{16}"$ this 1% expansion will amount to about two one-thousandths of an inch which is entirely allowable. I have, therefore, in my invention provided for a restriction or confinement of the outside surface of the molded plastic composition part so that any appreciable expansion which will occur will be in thickness only. Such a composite piston would be much lighter than a solid metal one.

My figures have proved this expansion of thickness can be readily taken up by the normal clearance around the disc piston, so that by use of the reinforcement shown in my invention it is possible to use a composition which contains a small quantity of hard rubber to provide the necessary resilience which is required to prevent breakage by shock. These advantages are attained by the novel construction hereinafter described and shown in the accompanying drawing in which.

Figure 3:
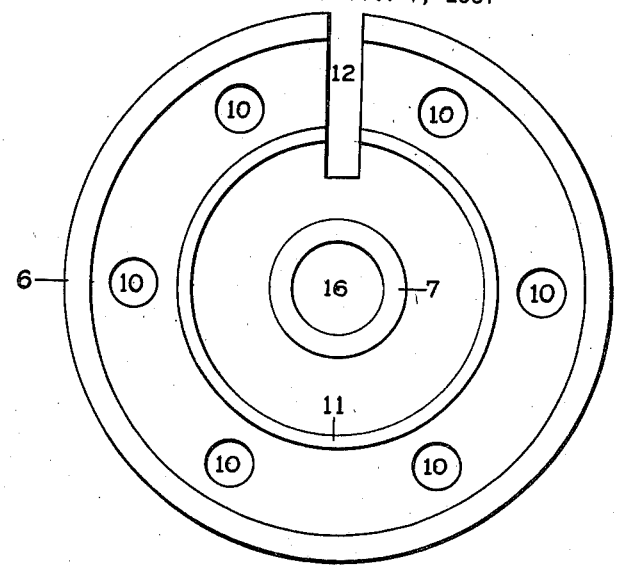
Figure 3 is a top view of the reinforcement itself.

Referring to the drawing disc piston 4 is shown to comprise essentially reinforcement 5 which is shown with an overhanging peripheral rim 6 and an overhanging hub 7 which together form an annular recess 8 in which is located part 9 which is a molded plastic composition imbedded within reinforcement 5, 10, 10, 10, 10, 10, and 10 are holes through which the plastic flows to lock itself in position. 11 is a bead projecting from the flat bottom of reinforcement 5 to form an additional anchorage for plastic part 9. 12 is a slot such as is required in this type of piston for proper nutation. 13 and 13A are half balls which are held together on either side of piston 4 by pin 14 which passes through both of the half balls and the piston itself. Half balls 13 and 13A are usually made with projecting hubs 15 and 15A which fit into center hole 16 all according to usual water meter construction.

Plastic part 9 by this construction is of sufficient thickness to have strength in itself, being twice as thick as if it were distributed on either side of a central reinforcing plate of the usual type. Part 9 is firmly locked in place as it is molded in recess 8 and would not fall out even if cracked slightly.

The essential features of my invention are the exposed peripheral edge of the reinforcement itself forming the actual peripheral edge of the disc piston, together with overhanging retaining walls in the recess into which the molded plastic is placed.

Figure 2:
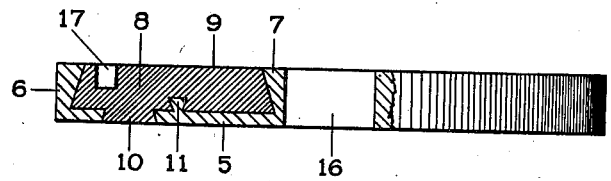
Figure 2 represents a view of the piston partially in section and shows details of the metallic reinforcement.
Figure 1:
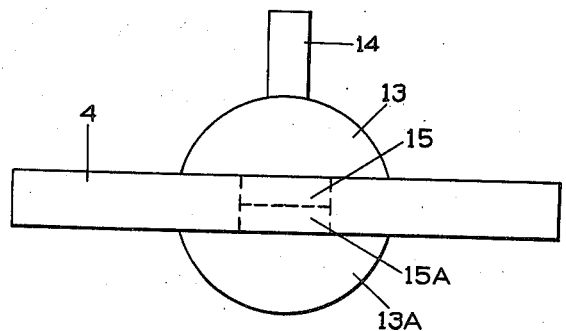
Figure 1 represents an exterior view of the disc piston as used, the piston web being shown fitted with two half balls and a disc pin.

I also show in Figure 2 an expansion space 17 which is placed near the outer edge of part 9 to allow a slight crushing if necessary when part 9 expands excessively when heated. These expansion spaces would be several in number and distributed around the piston. They preferably would be cylindrical in shape as it is necessary to have a short dimension when measured circumferentially. A long open space along a circumference would bring about leakage at the point of contact between the flat side of the disc piston and the conical surface of the measuring chamber. Attempts have been made to allow for expansion by means of annular slots in the face of the disc piston but one so constructed obviously would not operate in a meter as the leakage through such long narrow slots would allow the passage of liquid without movement of the piston. My invention similarly provides for the molded plastic part 9 to be in one piece rather than in a number of pieces as this is necessary to give the necessary strength and to prevent individual pieces from becoming detached from the disc piston assembly. I have also provided for the replacement of commercial hard rubber by a loaded molded plastic with a much lower thermal expansion so that the heat encountered in a usual hot water meter will not cause deformation by reason of the expansion of the plastic part of the disc at the higher temperatures.

The disc piston shown in my invention is a great improvement over the ribbed all metal disc formerly used. While the use of a number of radial ribs with spaces between them cuts down the weight greatly over a solid metal disc piston, nevertheless, these ribs would dig into the conical surface of the measuring chamber with resultant wear, and the ribbed disc itself would be much less buoyant when immersed in liquid than a disc of greater displacement without the large cavities between the ribs.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, that which I claim as new and desire to secure by Letters Patent, is:

1. A water meter piston for use in hot and cold water, comprising a metallic reinforcement having an upper exposed rim around the outer circumference of the piston and an overhanging inner lip of said rim forming an annular recess within said reinforcement, and a molded part of lighter weight material engaging said reinforcement within said recess, substantially as and for the purpose described.

2. A water meter piston for use in hot and cold water within a metallic measuring chamber, comprising a metallic reinforcement in said piston having substantially the same coefficient of thermal expansion as the enclosing measuring chamber, an upper exposed metallic rim around the outer circumference of said piston forming an annular recess within said reinforcement, a molded part of lighter weight material engaging said reinforcement inside of said rim, and means for locking said molded part rigidly against said reinforcement, substantially as and for the purpose described.

3. A water meter piston for use in hot and cold water, comprising a metallic reinforcement for said piston, an exposed non-corrodible metallic rim around the outer circumference of said piston and integral with said reinforcement, a central metallic hub integral with said reinforcement, a recess in said reinforcement between said rim and said hub, removable half balls engaging said hub to form a central bearing portion, held in said recess a molded plastic part of relatively low specific gravity compared with the metal of said rim, and means for locking said molded part rigidly against said reinforcement, substantially as and for the purpose described.

4. A water meter piston for use in hot and cold water, comprising a metallic reinforcement extending across said piston and having a metallic reinforcing rim having a low coefficient of thermal expansion and located at the outer circumference of said piston, an inner part of lighter weight material having a slightly higher coefficient of thermal expansion as compared with the metal of said rim, a plurality of non-connecting expansion spaces near the outer edge of said inner part to allow an increase in the net volume of said part when heated without a corresponding increase in the distance between the opposing outer edges of said part, and means for locking said part rigidly against said rim, substantially as and for the purpose described.

ROBERT S. BASSETT.